(12) United States Patent
Park et al.

(10) Patent No.: US 8,219,160 B2
(45) Date of Patent: Jul. 10, 2012

(54) PORTABLE ELECTRONIC DEVICE

(75) Inventors: Hyo-Sung Park, Gyeonggi-Do (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 895 days.

(21) Appl. No.: 11/936,618

(22) Filed: Nov. 7, 2007

(65) Prior Publication Data

US 2008/0125200 A1  May 29, 2008

(30) Foreign Application Priority Data

Nov. 27, 2006 (KR) .................. 10-2006-0117974

(51) Int. Cl.
*H04M 1/00* (2006.01)
(52) U.S. Cl. .................................. 455/575.4
(58) Field of Classification Search ............... 455/575.1, 455/575.4
See application file for complete search history.

(56) References Cited

U.S. PATENT DOCUMENTS

| 7,733,278 B2 * | 6/2010 | Kanasaki et al. ............. 343/702 |
| 2005/0059443 A1 * | 3/2005 | Pan et al. .................... 455/575.4 |
| 2005/0079902 A1 * | 4/2005 | Chen et al. .................. 455/575.4 |
| 2005/0124398 A1 * | 6/2005 | Lee et al. .................... 455/575.4 |
| 2005/0136698 A1 * | 6/2005 | Kwon ............................. 439/38 |
| 2005/0288076 A1 * | 12/2005 | Seol ........................... 455/575.4 |
| 2009/0227300 A1 * | 9/2009 | Lee et al. .................... 455/575.4 |

FOREIGN PATENT DOCUMENTS

| EP | 1545099 A1 | 6/2005 |
| EP | 1858234 A2 | 11/2007 |
| WO | WO 2004112267 A1 * | 12/2004 |

* cited by examiner

*Primary Examiner* — Temesgh Ghebretinsae
*Assistant Examiner* — Gennadiy Tsvey
(74) *Attorney, Agent, or Firm* — Birch, Stewart, Kolasch & Birch, LLP (57) ABSTRACT

A portable electronic device including a first body having a first pair of opposing sides, a second body having a second pair of opposing sides, the second pair of opposing sides being in slidable engagement with the first pair of opposing sides to move the first body from a first position to a second position, and a magnetic unit located adjacent at least one side of the pair of opposing sides of the first body and at least one side of the pair of opposing sides of the second body. Further, the magnetic unit is configured to generate a magnetic force to bias the first body toward one of the first position and the second position.

18 Claims, 10 Drawing Sheets

PORTABLE ELECTRONIC DEVICE

CROSS-REFERENCE TO RELATED APPLICATIONS

This application claims priority to Korean Application No. 10-2006-0117974, filed Nov. 27, 2006, and is herein incorporated by reference.

BACKGROUND OF THE INVENTION

1. Field of the Invention

The present invention relates to a portable electronic device and, more particularly, to a portable electronic device including two bodies formed such that one body can be slidably moved with respect to the other body via a magnetic unit.

2. Description of Related Art

Generally mobile terminals are a type of electronic devices that have a communication module for wirelessly transmitting and receiving radio waves to allow a user to perform communication while traveling. Mobile terminals can be divided into bar type mobile terminals, folder type mobile terminals and slide type mobile terminals, among others, according to its mechanical form. Bar type mobile terminals are formed as having only one body, and the folder type mobile terminals have two bodies that are rotatably connected about a hinge portion. Slide type mobile terminals are constructed such that one body is slidably moved between a first position and a second position to expose or cover at least a portion of the other body.

Figure 1:
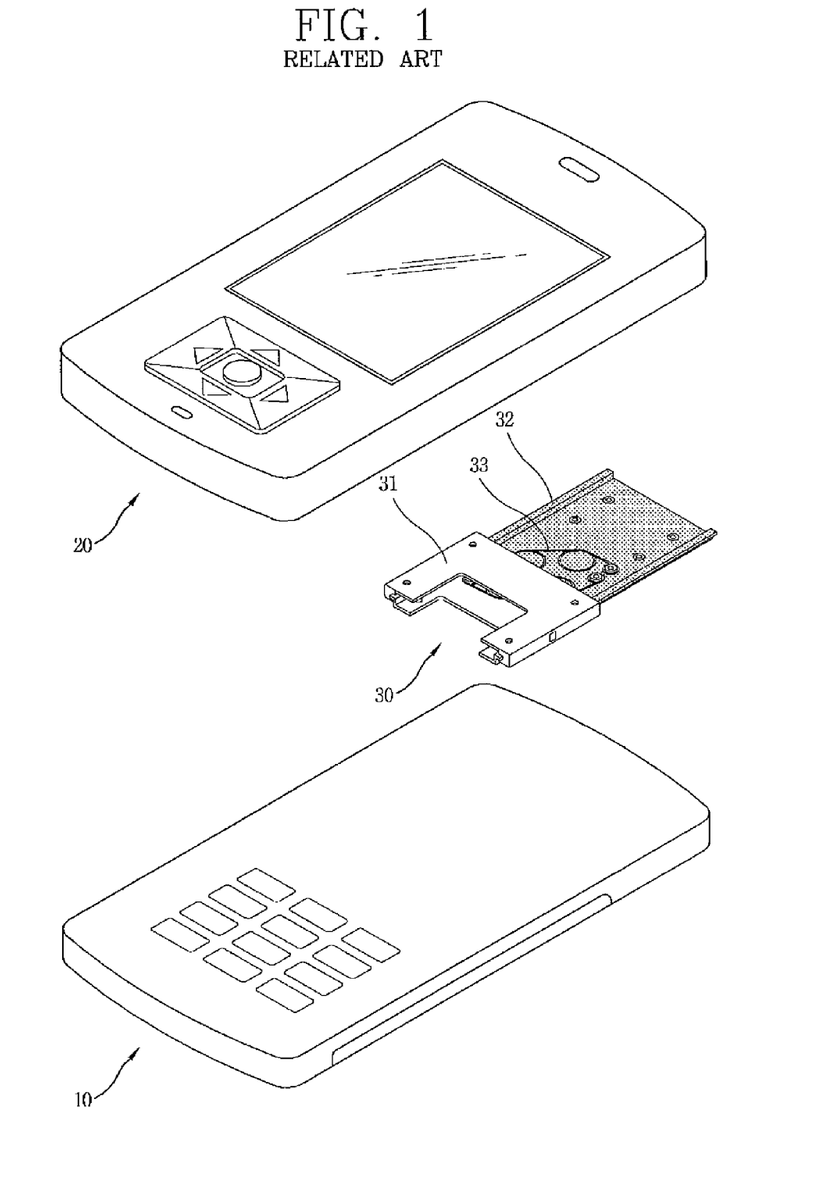
FIG. 1 is an exploded perspective view of a conventional slide type mobile terminal.

As seen in FIG. 1, a related art slide type mobile terminal includes a first body 10, a second body 20, and a slide module 30 located between the first and second bodies 10 and 20. The slide module includes a slider 31 and a slide base 32. While not shown in FIG. 1, the slider 31 and the slide base 32 are combined with and/or connected to the first and second bodies 10 and 20, respectively. The slider 31 and the slide base 32 are connected to be slidable with respect to each other, and consequently, the first and second bodies 10 and 20 are also slidably connected.

A spring 33 connects the slider 31 and the slide base 32 and provides elastic force to assist in slidably opening and closing the second body 20 with respect to the first body 10. When the user slidably moves the second body 20 beyond a certain interval towards either the open position or closed position, sliding of the second body 20 assisted by the elastic force of the spring 33 over the remaining interval.

As described above, the slide module 30 allows the first and second bodies 10 and 20 to slide (or move) with respect to each other. However, because slide modules generally have a thickness of about 0.6 mm to 2.5 mm, the size of the slide module hampers the ability to reduce the overall size (thickness) of a mobile terminal.

BRIEF SUMMARY OF THE INVENTION

Therefore, an aspect of the exemplary embodiments of the invention is to provide a slim portable electronic device which can be opened or closed in a semi-automatic sliding manner.

To achieve these and other advantages and in accordance with the purpose of the present invention, as embodied and broadly described herein, there is provided a portable electronic device that includes a first body having a first pair of opposing sides, a second body having a second pair of opposing sides, the second pair of opposing sides being in slidable engagement with the first pair of opposing sides to move the first body from a first position to a second position, and a magnetic unit located adjacent at least one side of the pair of opposing sides of the first body and at least one side of the pair of opposing sides of the second body, the magnetic unit being configured to generate a magnetic force to bias the first body toward one of the first position and the second position.

In accordance with the purpose of the present invention, as embodied and broadly described herein, there is also provided a portable electronic device that includes a first body, a second body slidably connected to the first body, a guide rail located at one of the first body and the second body, a projection located at the other of the first body and the second body, the projection being moveable along the guide rail, and a magnetic unit located adjacent the guide rail and the projection, the magnetic unit being configured to generate a magnetic force to bias the first body toward one of a first position and a second position.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

A portable electronic device according to exemplary embodiments of the present invention will now be described in detail with reference to the accompanying drawings. Wherever possible, similar parts have been given similar names and numerical designations. While the present invention will be described with reference to a mobile terminal that is capable of performing a wireless communication function, the present invention is not limited thereto. For example, the portable electronic device may be a mobile game player, a mobile music player, a PDA, and a calculator, among other portable electronic devices. In addition, the present invention can be applicable to any type of electronic device so long as it includes two or more bodies that are slidably coupled.

As seen in FIGS. 2 to 5, the portable electronic device includes a first body 100 and a second body 200 slidably connected thereto. A battery 150 is detachably mounted to the first body 100 and may define a surface of the first body 100 such as a rear surface of the first body 100. In this exemplary embodiment, the battery 150 is located on a rear surface to define a main surface that opposes the second body 200, and provides power to the portable electronic device. An input unit 160 (FIG. 5) is disposed on a surface of the first body 100 that faces the second body 200. An input unit 140 and a microphone 170 are disposed on a surface of the second body 200 that opposes the first body 100, and a window 240 and a speaker 250 are disposed on an upper portion of the surface having the input unit 140 and the microphone 170.

The input units 140 and 160 include one or more key buttons 140a and 160a, respectively, and are configured to generate signals that convey information, such as numbers or characters inputted by a user. For example, the input units 140 and 160 can be manipulated by a user's fingers, and when the user presses key buttons 140a and 160a, dome switches (not shown) disposed on a circuitry supporting substrate 130 (FIG. 3A), such as a printed circuit board (PCB), within the portable electronic device are pressed to generate signals.

Figure 2:
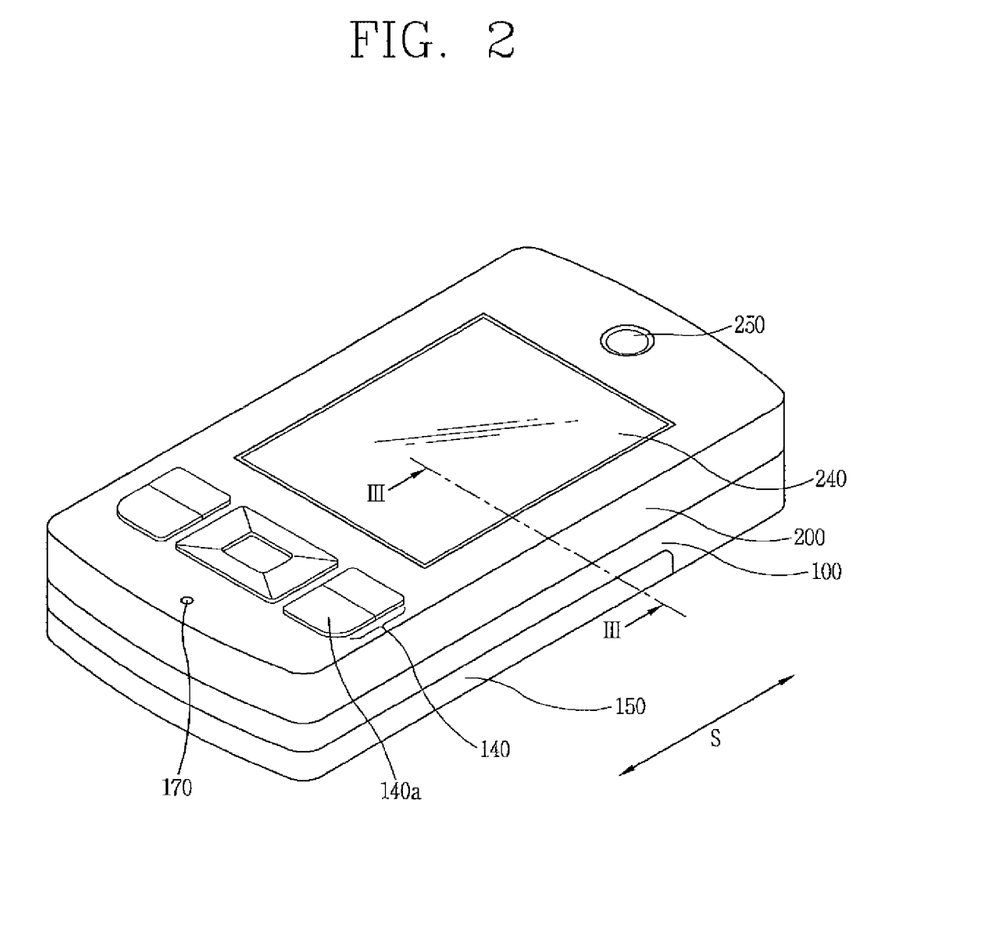
FIG. 2 is a perspective view showing a portable electronic device according to one exemplary embodiment of the present invention.

The construction for the sliding and semi-automatic or assisted sliding operation between the first and second bodies 100 and 200 will now be described with reference to FIGS. 3 and 3A. The first body 100 includes a front cover 110 and a rear cover 120 that are combined or otherwise connected to each other. The PCB 130 is disposed in the space between the front cover 110 and the rear cover 120. As described above, the PCB 130 electrically controls the input units 140 and 160 upon receiving power from the battery 150 (FIG. 2).

The front cover 110 includes at least one bent portion 111 that extends away from a main face or main part 110a of the front cover 110 at a side thereof. A limiting portion 112 extends at an angle from the bent portion 111 and extends toward the center of the main part 110a of the front cover 110. As will be described below, the limiting portion 112 assists in preventing the first body 100 and the second body 200 from being separated from each other.

The second body 200 includes a lower cover 210 and an upper cover 220. A display unit 230 is located in a space defined between the lower and upper covers 210 and 220. The display unit 230 is electrically controlled by the PCB 130, and visual information displayed on the display unit 230 is recognized by the user through window 240. The display unit 230 may be a liquid crystal display (LCD) or an organic light emitting diode (OLED), or any other suitable display.

A main face or a main part 210a of the lower cover 210 of the second body 200 is arranged to face the main face or the main part 110a of the front cover 110. A separation wall 211 bent and extending from the lower cover 210 towards the upper cover 220 fixes the display unit 230 within the second body 200.

The side part of the lower cover 210 includes a projection 320 extending from the separation wall 211. The projection 320 is inserted in a guide rail 310 defined by the bent portion 111 and the limiting portion 112 of the front cover 110. The limiting portion 112 prevents the first and second bodies 100 and 200 from being separated from each other. Accordingly, the guide rail 310 and the projection 320 form a slide part 300 that slidably combines the first and second bodies 100 and 200.

While the present invention has been describe by reference to a guide rail 310 and a projection 320, it is understood that a pair of guide rails and a pair of projections may be provided at opposing sides of the first body and the second body respectively. It is also understood that the location of the guide rail 310 and projection may be reversed such that the first body 100 has the projection and the second body 200 has the guide rail.

Because the slide part 300 is disposed at the side parts of the front cover 110 and the lower cover 210, rather than between the front cover 110 and the lower cover 210, the overall thickness of the portable electronic device is reduced as compared to related art portable electronic devices where the slide unit is arranged between the first and second bodies. In other words, the slide unit 300 is not the primary design criteria affecting the overall thickness of the portable electronic device.

Figure 3:
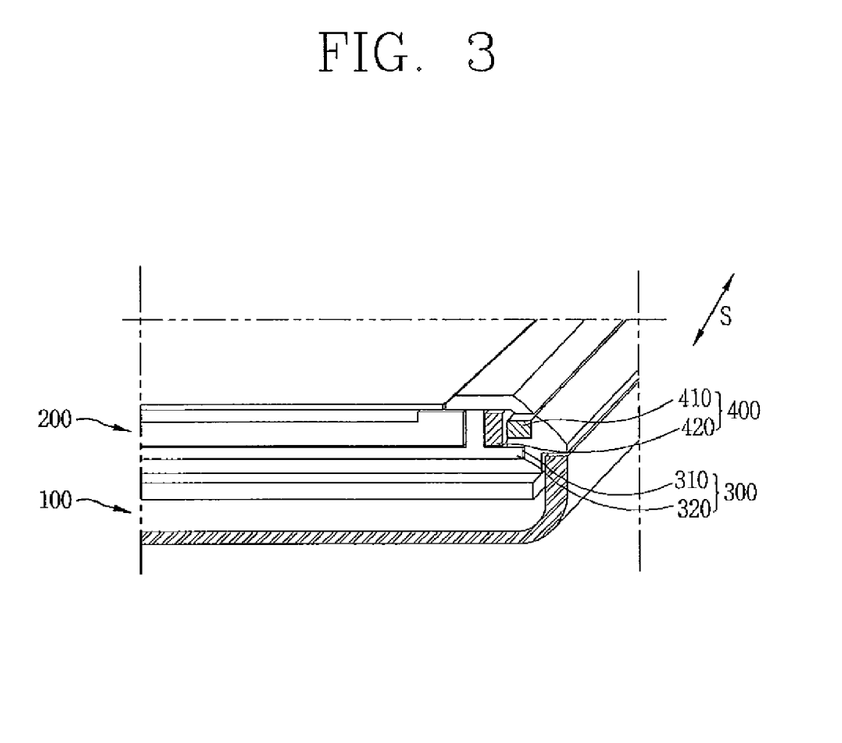
FIG. 3 is a cut-away view taken along line III-111 in FIG. 2.
Figure 3A:
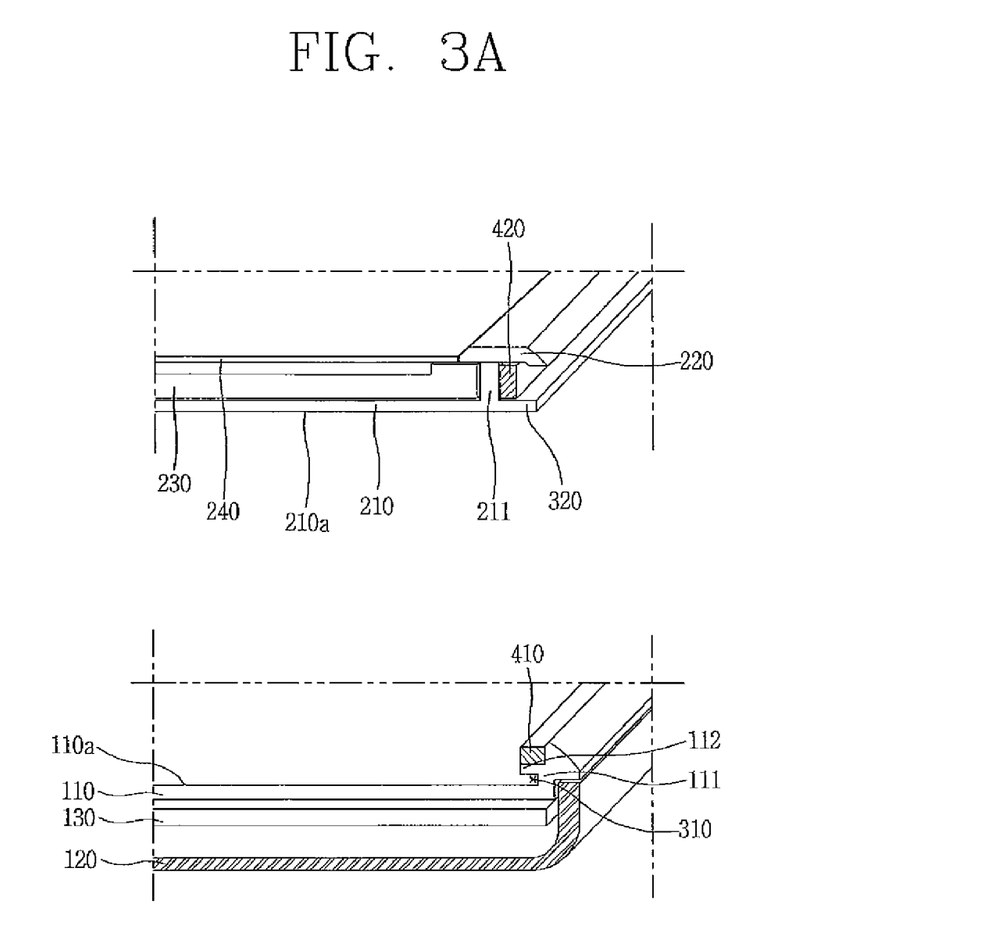
FIG. 3A is an exploded view of FIG. 3.

As seen in FIGS. 3 and 3A, the portable electronic device includes a magnetic unit 400 that can be used to assist in the sliding operation of the first and second bodies 100 and 200. The magnetic unit 400 may be located at opposing sides of the first and second bodies 100 and 200.

The magnetic unit 400 includes first and second magnet parts 410 and 420. The first magnet part 410 is located on the side part of the front cover 110, for example, on the limiting portion 112. The second magnet part 420 is located at a space defined by the lower cover 210 and the separation wall 211, and adjacent the first magnet part 410 when the portable electronic device is assembled.

Figure 4:
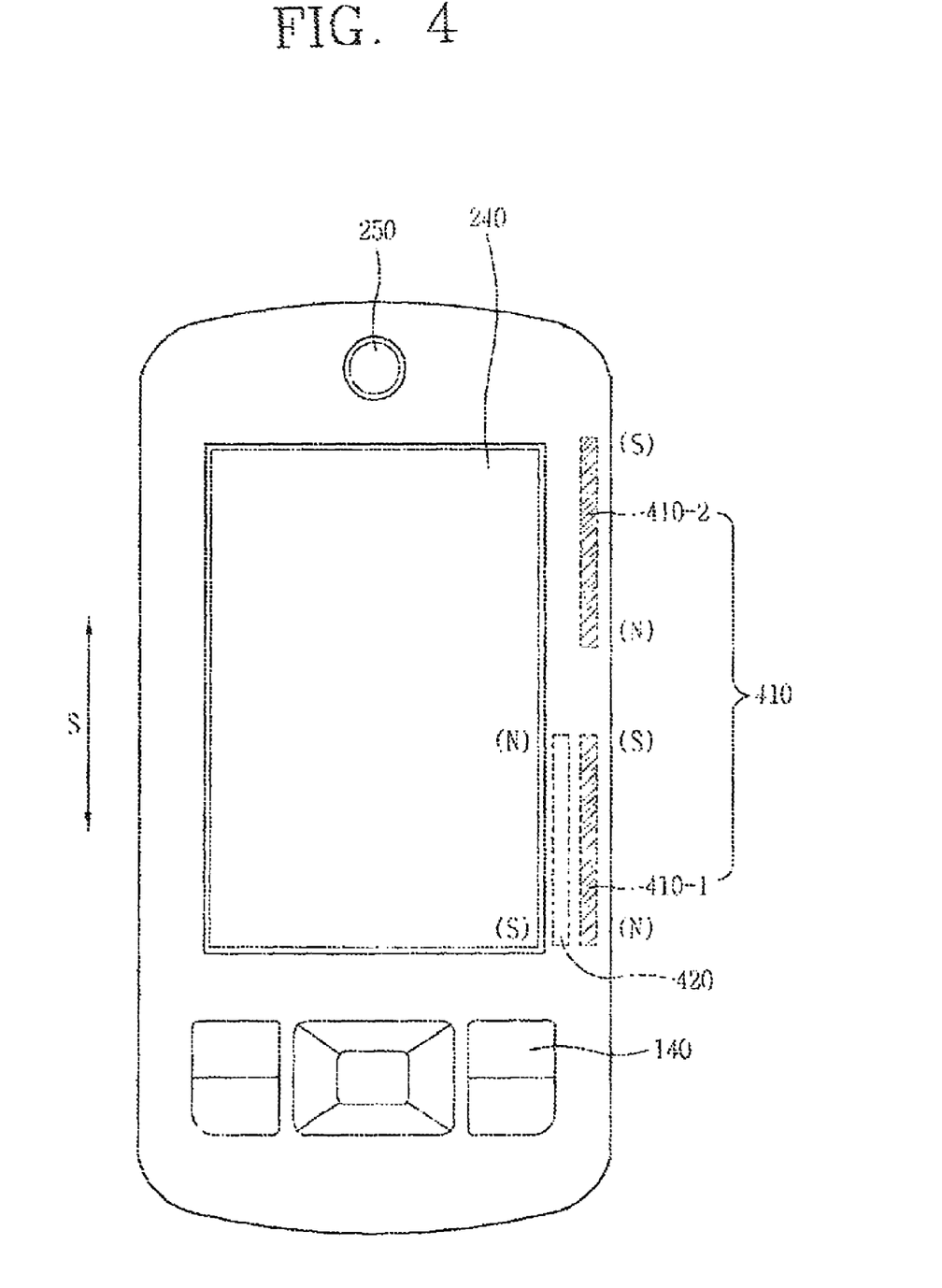
FIG. 4 is a conceptual view showing a magnetic force driving unit with the portable electronic device closed in FIG. 2.
Figure 5:
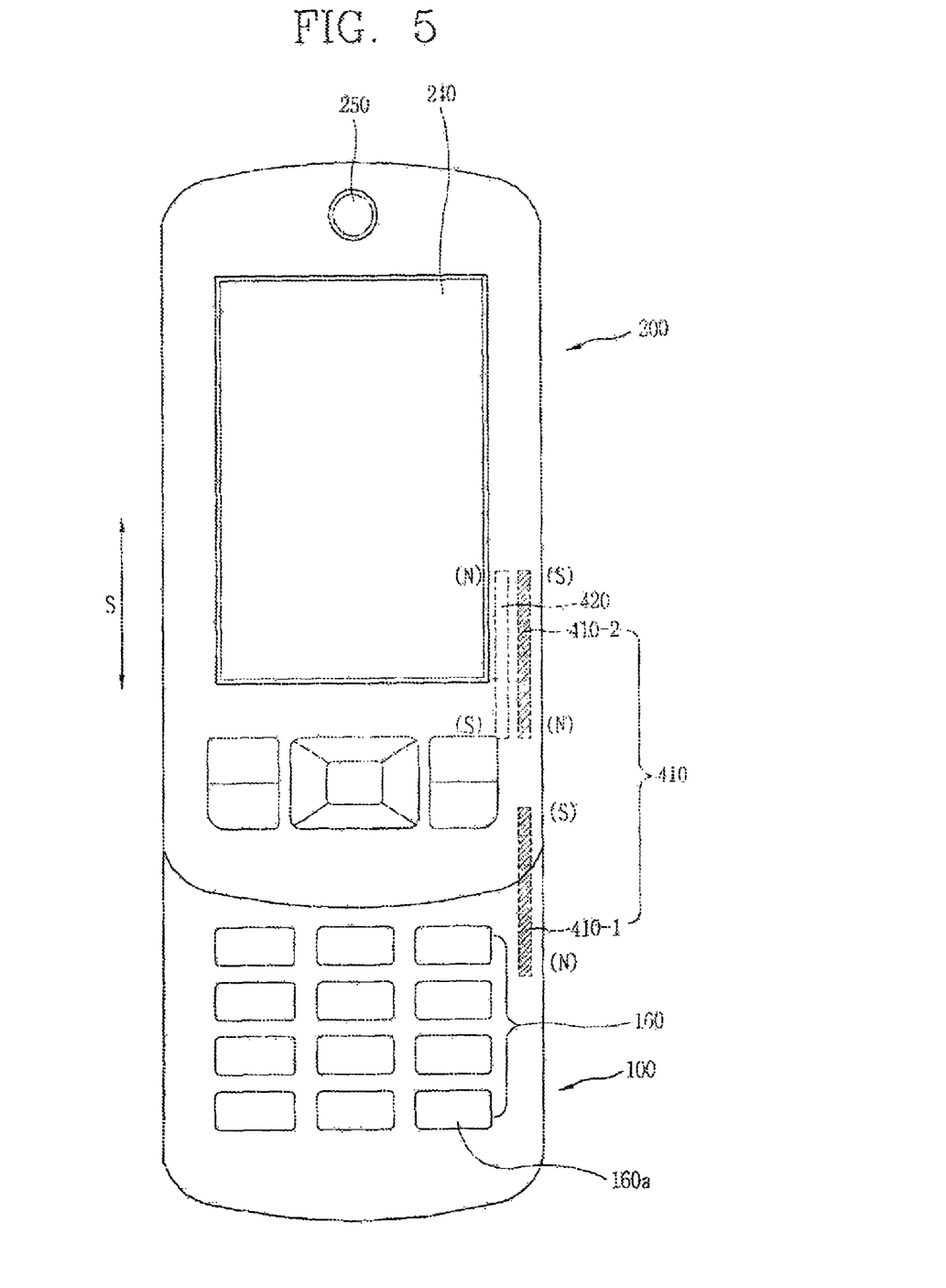
FIG. 5 is a conceptual view showing the portable electronic device of FIG. 4 in an opened state.

The first magnet part 410 includes a pair of first and second magnets 410-1 and 410-2. The first and second magnets 410-1 and 410-2 are disposed to be parallel to a sliding direction (S) of the second body 200 or to a lengthwise direction of the portable electronic device. The second magnet part 420 may be a single magnet, unlike the first magnet part 410 (FIGS. 4 and 5).

Similar to the slide part 300, the magnetic unit 400 is located at the side parts of the first and second bodies 100 and 200, and consequently, it does not increase the overall thickness of the portable electronic device.

Having described the arrangement of the slide part 300 and the magnetic unit 400, operation of the portable electronic device will be illustrated with reference to FIGS. 4 and 5. As shown in FIG. 4, when the portable electronic device is in a closed state such that that the second body 200 is located to completely overlap with the first body 100, the first magnet 410-1 of the first magnet part 410 is arranged to be parallel to the second magnet part 420. In this position, the end portions of the magnet 410-1 and of the second magnet part 420 have mutually opposite polarities.

When the user slides the second body 200 in the lengthwise direction (designated S) with respect to the first body 100, the first magnet 410-1 and the magnet of the second magnet part 420 attract each other (S-N), thereby interfering with the sliding movement. As the user applies more force to overcome the interfering force, the adjacent end portions of the magnet of the second magnet part 420 and the second magnet 410-2 are brought closer together. Because the magnet of the second magnet part 420 and the second magnet 410-2 have the same polarity (N-N), force generated from this disposition also interferes with the sliding movement of the second body 200.

When the user applies more force to overcome the interfering force between the magnet of the second magnet part 420 and the second magnet 410-2, the magnet of the second magnet part 420 and the other end portion of the second magnet 410-2 are brought closer together and interact with each other. Because the interacting end portions of the magnet of the second magnet part 420 and the second magnet 410-2 have mutually opposite polarities (N-S), attraction forcer work therebetween. As a result, the sliding of the second body 200 with respect to the first body 100 is assisted over the remaining interval to open the portable electronic device, as shown in FIG. 5. In the open position, the second body 200 partially overlaps the first body 100.

To close the portable electronic device, the user slides the second body towards the original position, as shown in FIG. 4. The operation of the magnetic unit 400 when the portable electronic device is slid from the opened state to the closed state is reversed from that described above, and therefore, further description is omitted.

During the sliding operation, the slide part 300 guides the movement of the second body 200 with respect to the first body 100. In addition, while the above description shows the magnetic unit located at one side of the portable electronic device, the magnetic unit 400 may be located at both sides of the portable electronic device.

In this exemplary embodiment, the magnetic unit 400 generates force between the first and second magnet parts 410 and 420 while they are not in contact with each other. Accordingly, no friction is produced in operating the magnetic unit 400 which allows the sliding operation to be performed smoothly.

Figure 6:
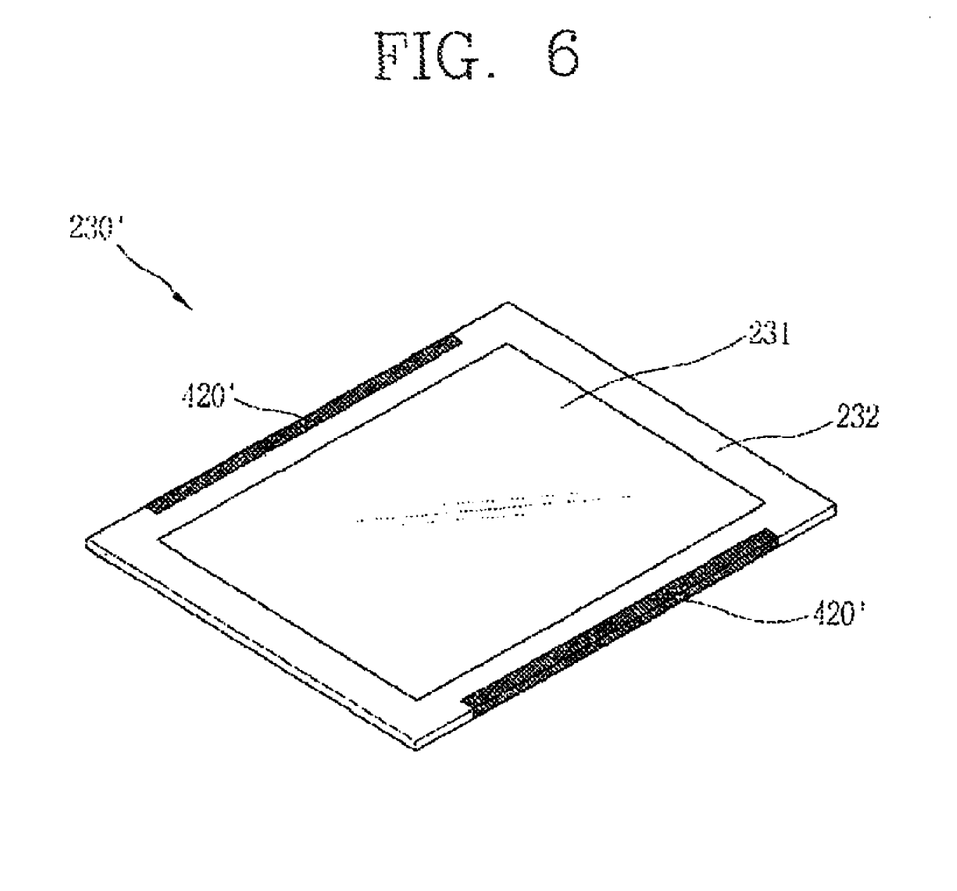
FIG. 6 is a perspective view showing a display unit according to another exemplary embodiment of the present invention.

According to another exemplary embodiment, as shown in FIG. 6, a display unit 230' includes a display module 231 and a frame 232. The display module 231 displays visual information under the control of the PCB 130 (same as in FIG. 3), and the frame 232 supports the display module 231. Other features of the portable electronic device are similar to those described with respect to the first exemplary embodiment except that, in the second exemplary embodiment, a second magnet part 420' mounted at least one side of the frame 232 corresponds to the second magnet part 420 of the magnetic unit 400 in the previous exemplary embodiment. Thus, there is no need to extend the projection 320 of the lower cover 210 to support the second magnet part 420. As a result, not only the thickness of the lower cover 210, but also, the overall thickness and width of the entire portable electronic device can be reduced in size.

Figure 7:
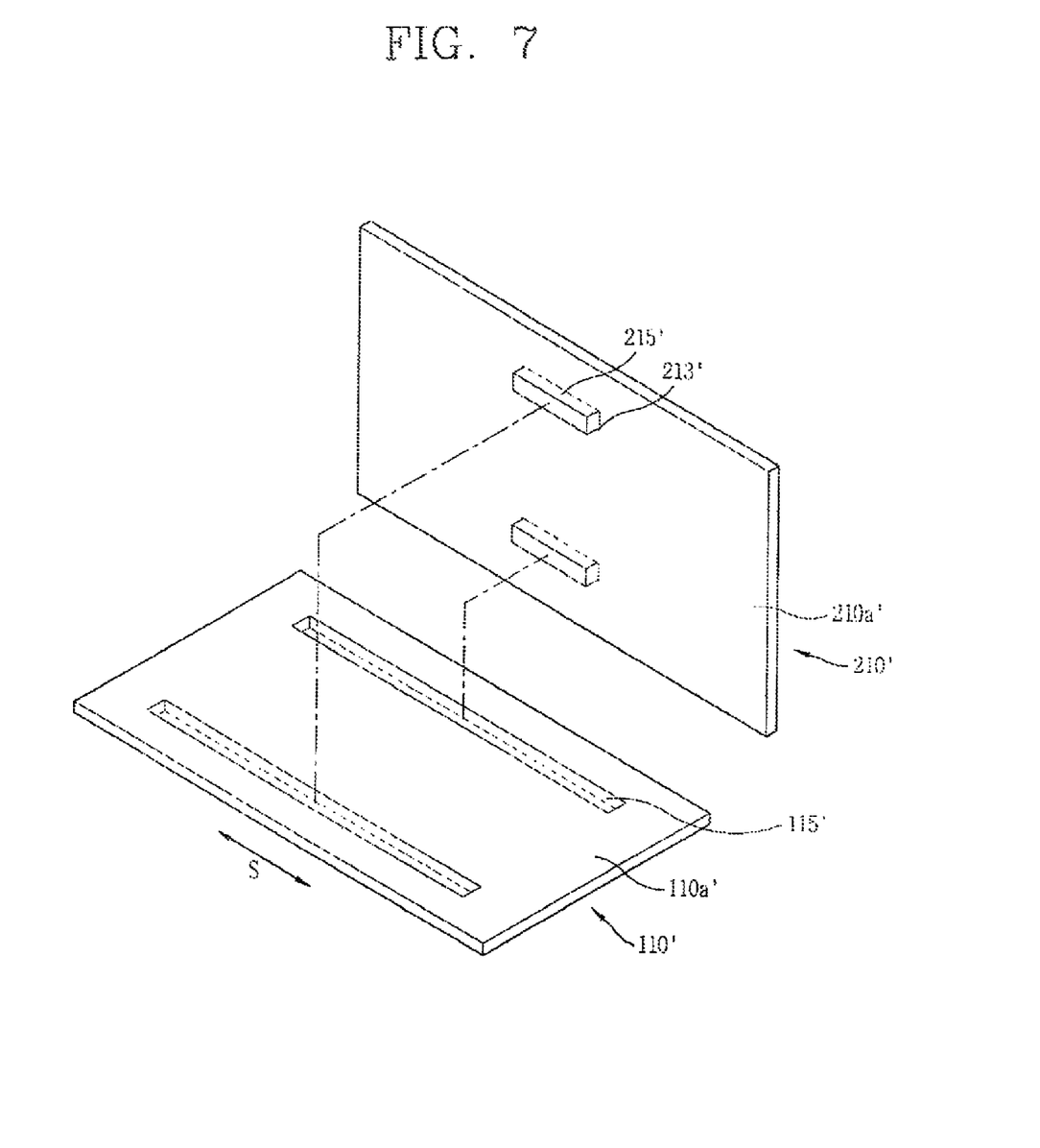
FIG. 7 is a schematic perspective view of a front cover and a lower cover of a portable electronic device according to still another exemplary embodiment of the present invention.

In yet another exemplary embodiment, as shown in FIG. 7, a front cover 110' and a lower cover 210' of a portable electronic device may be further modified. This exemplary embodiment is directed to features of the main parts 110a' and 210a' of the front cover 110' and lower cover 210', respectively, and the other remaining construction of the portable electronic device is the same as the above-described first exemplary embodiment of the present invention.

In this embodiment, the lower cover 210' is made of metal or metallic material. As compared to the front cover 110 and the lower cover 210 (FIG. 3) which may generally be formed of injection-molded material such as plastic, the lower cover 210' can be formed to be thinner. This is because a minimum fabrication thickness of the metal is smaller than that of the injection-molded material. In this exemplary embodiment, the front cover 110', as well as the lower cover 210', can be also made of a metal or metallic material.

However, because of the types of material used in the front cover 110' and lower cover 210', frictional contacting between the main parts 110a' and 210a' in their relative sliding operation needs to be reduced. For this purpose, sliding protrusions 215' are formed on the main part 210a' of the lower cover 210', and sliding grooves 115' are formed on the main part 110a' of the front cover 110'. The sliding protrusions 215' and the sliding grooves 115' correspond to each other and may be formed as a pair parallel to each other along the sliding direction (S).

Openings 213' may be formed in the lower cover 210' and the sliding protrusions 215' may be made of a resin material and are integrally double injection-molded such that the sliding protrusions 215' are partially inserted in the openings 213'. Alternatively, the sliding protrusions 215' can be insertedly fixed in the openings 213' or otherwise attached to the lower cover 210'.

Because of the sliding protrusions 215' are provided, the main parts 110a' and 210a' of the front cover 110' and the lower cover 210' are not in full contact with each other. In other words, the main parts 110a' and 210a' contact only at the portions where the sliding protrusions 215' are formed. Accordingly, frictional contacting between the lower cover 210' and the front cover 110' can be reduced.

In addition, the sliding grooves 115' help to reduce a gap between the lower cover 210' and the front cover 110', which are slightly separated due to the sliding protrusions 215'. As a result, the thickness of the overall portable electronic device that would otherwise be increased by the sliding protrusions 215' can be reduced by the sliding grooves 115'. Consequently, in this exemplary embodiment, the particular structure or construction that allows the smooth sliding operation of the portable electronic device (i.e., the sliding protrusions 215') is not detrimental in making the portable electronic device slimmer by means of the slide part 300, the magnetic unit 400, and the like.

Figure 8:
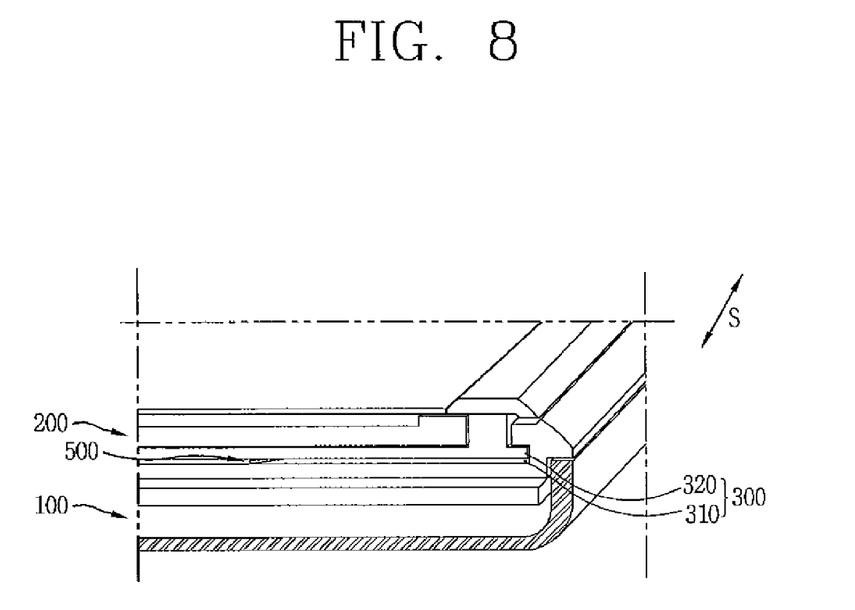
FIG. 8 is a cut-away view showing a portable electronic device according to a still another exemplary embodiment of the present invention.
Figure 8A:
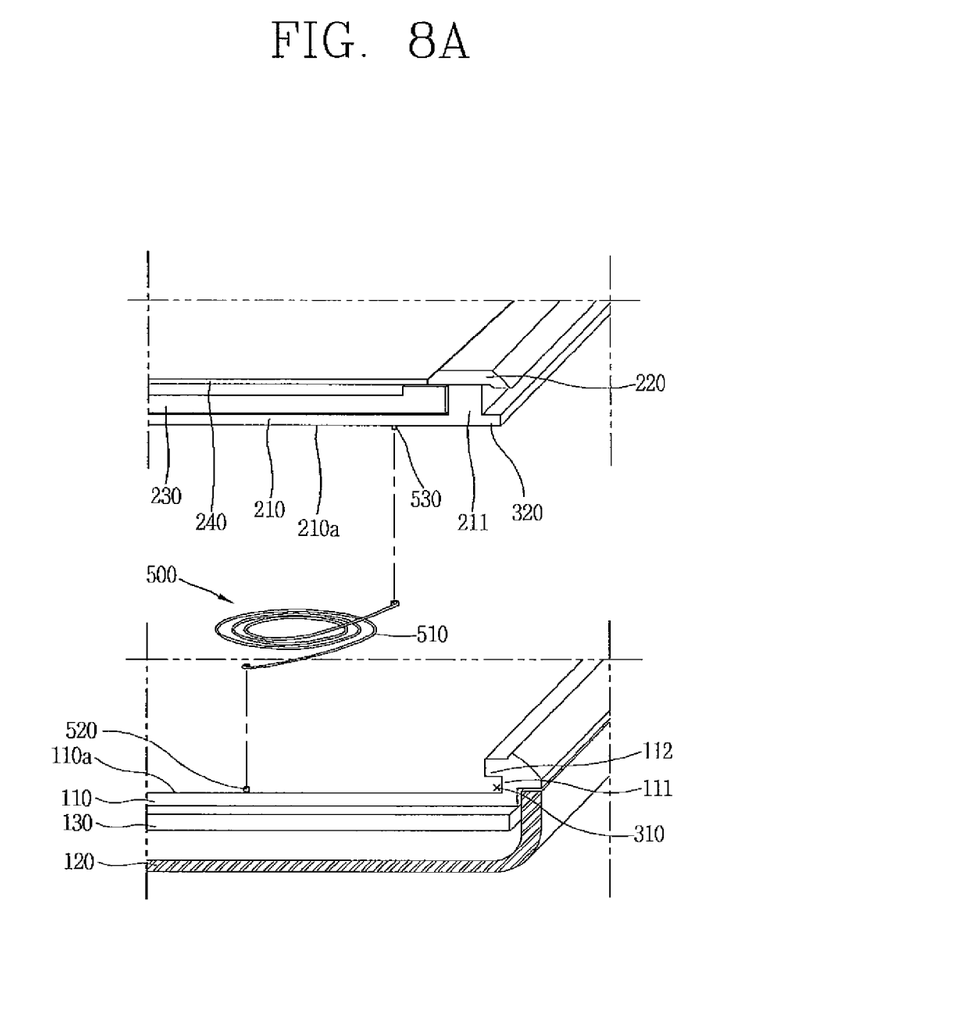
FIG. 8A is an exploded view of FIG. 8.

According to another exemplary embodiment, as seen in FIGS. 8 and 8A, an elastic driving unit 500 may be used in place of the magnetic unit 400 of the previous embodiments. Therefore, except for the elastic driving unit 500, descriptions of the same construction of the portable terminal will not be described unless necessary for understanding the configuration and/or operation of the elastic driving unit 500.

The elastic driving unit 500 includes a spring 510 and first and second connection protrusions 520 and 530 formed on the front cover 110 and the lower cover 210, respectively. The spring 510 extends in a wire form, and includes a wound portion at its central portion between both end portions thereof. The first and second connection protrusions 520 and 530 are formed to be protruded from the main part 110a of the front cover 110 of the first body and the main part 210a of the lower cover 210 of the second body 200, respectively. Both end portions of the spring 510 are connected with the first and second connection protrusions 520 and 530.

According to this configuration, when the second body is partially slid with respect to the first body 100, the spring 510 elongates to accumulate an elastic force. The accumulated elastic force is provided to assist in the sliding movement in the remaining interval of the sliding movement. The user can slide the second body 200 with respect to the first body 100 by virtue of the elastic force.

Although the elastic driving unit 500 is disposed between the front and lower covers 110 and 210, the overall thickness of the portable electronic device can become slim because the slide part 300 is formed at the adjacent side parts of the first and second bodies 100 and 200.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed:

1. A portable electronic device comprising:
   a first body having a first pair of opposing sides;
   a second body having a second pair of opposing sides, the second pair of opposing sides being in slidable engagement with the first pair of opposing sides to move the first body from a first position to a second position;
   a magnetic unit located adjacent at least one side of the pair of opposing sides of the first body and at least one side of the pair of opposing sides of the second body, the magnetic unit being configured to generate a magnetic force to bias the first body toward one of the first position and the second position;
   a display unit for displaying visual information disposed in the second body, the display unit including a display module configured to display visual information and a frame configured to support the display module, the frame being mounted at a cover portion of the second body; and
   a window mounted at a front surface of the second body and configured to overlap the display unit,
   wherein the first pair of opposing sides includes a guide rail, the second pair of opposing sides includes a projection extended from the cover portion of the second body, and the projection is moveable within the guide rail,
   wherein at least one bent portion extends away from a cover portion of the first body, a limiting portion extends at an angle from the bent portion, and the guide rail is defined by the bent portion and the limiting portion, and
   wherein the magnetic unit includes:
      a first magnet part mounted at the limiting portion to overlap the guide rail; and
      a second magnet part positioned to be apart from the first magnet part in a direction orthogonal to a thickness direction of the first or second body, and the second magnet part being mounted at at least one side of the frame.

2. The device of claim 1, wherein
   the first magnet part is located at at least one of the opposing sides of the first pair of opposing sides; and
   the second magnet part is located at at least one of the opposing sides of the second pair of opposing sides corresponding to the first magnet part.

3. The device of claim 2, wherein the first magnet part includes a pair of magnets located along the at least one of the opposing sides of the first pair of opposing sides.

4. The device of claim 2, wherein adjacent end portions of the first and second magnet parts have mutually opposite polarities.

5. The device of claim 1, wherein the cover portions of the first and second bodies are adjacent to each other, and at least one of the cover portions of the first body and the second body is metallic.

6. The device of claim 5, wherein the metallic cover portion includes a pair of sliding protrusions that protruded toward the other cover portion of the first and second body.

7. The device of claim 6, wherein the sliding protrusions include a resin material.

8. The device of claim 6, wherein the metallic cover portion of the second body includes a pair of openings extending between the first position and second position, and the pair of sliding protrusions are at least partially inserted into the pair of openings.

9. The device of claim 6, wherein the other cover portion includes a pair of sliding grooves corresponding to the sliding protrusions, and the pair of sliding protrusions are slidably received in the pair of sliding grooves.

10. The device of claim 9, wherein the sliding protrusions and the sliding grooves are formed parallel to each other.

11. The device of claim 1, further comprising:
    an input unit arranged on at least one of the first body and second body, the input unit being configured to input a command according to a user manipulation.

12. The device of claim 1, wherein the portable electronic device is a mobile terminal having a wireless communication module.

13. A portable electronic device comprising:
    a first body;
    a second body slidably connected to the first body;
    a guide rail located at the first body;
    a display unit for displaying visual information disposed in the second body, the display unit including a display module configured to display visual information and a frame configured to support the display module, the frame being mounted at a cover portion of the second body;
    a window mounted at a front surface of the second body and configured to overlap the display unit;
    a projection located at the second body, the projection being moveable along the guide rail and extended from the cover portion of the second body; and
    a magnetic unit located adjacent the guide rail and the projection, the magnetic unit being configured to generate a magnetic force to bias the first body toward one of a first position and a second position,
    wherein at least one bent portion extends away from a cover portion of the first body, a limiting portion extends at an angle from the bent portion, and the guide rail is defined by the bent portion and the limiting portion, and
    wherein the magnetic unit includes:
       a first magnet part mounted at the limiting portion to overlap the guide rail; and
       a second magnet part to be apart from the first magnet part in a direction orthogonal to a thickness direction of the first or second body, and the second magnet part being mounted at at least one side of the frame.

14. The device of claim 13, wherein the first magnet part includes a pair of magnets located along the guide rail.

15. The device of claim 14, wherein adjacent end portions of the first and second magnet parts have mutually opposite polarities.

16. The device of claim 13, wherein the cover portions of the first and second bodies are adjacent to each other, and at least one of the cover portions of the first body and the second body is metallic.

17. The device of claim 16, wherein the metallic cover portion includes a pair of sliding protrusions that protruded toward the other cover portion of the first and second body.

18. The device of claim 17, wherein the other cover portion includes a pair of sliding grooves corresponding to the sliding protrusions, and the pair of sliding protrusions are slidably received in the pair of sliding grooves.

* * * * *